March 16, 1943.  V. F. STEWART  2,314,253
FLUID CONTROLLED TRANSMISSION
Filed May 11, 1942  2 Sheets-Sheet 2

Inventor
Virgil F. Stewart
By A. D. Adams
Attorney

Patented Mar. 16, 1943

2,314,253

UNITED STATES PATENT OFFICE 2,314,253

FLUID CONTROLLED TRANSMISSION

Virgil F. Stewart, Cleveland, Ohio

Application May 11, 1942, Serial No. 442,518

4 Claims. (Cl. 74—189.5)

This invention relates to fluid controlled transmissions for hydraulic couplings of the type adapted to be used in automobiles and, among other objects, aims to provide a greatly improved, compact and highly efficient drive of this type capable of developing any desired driving torque and utilizing the centrifugal force of the fluid when the driven shaft or element reaches the same speed as the driving shaft.

Figure 1:
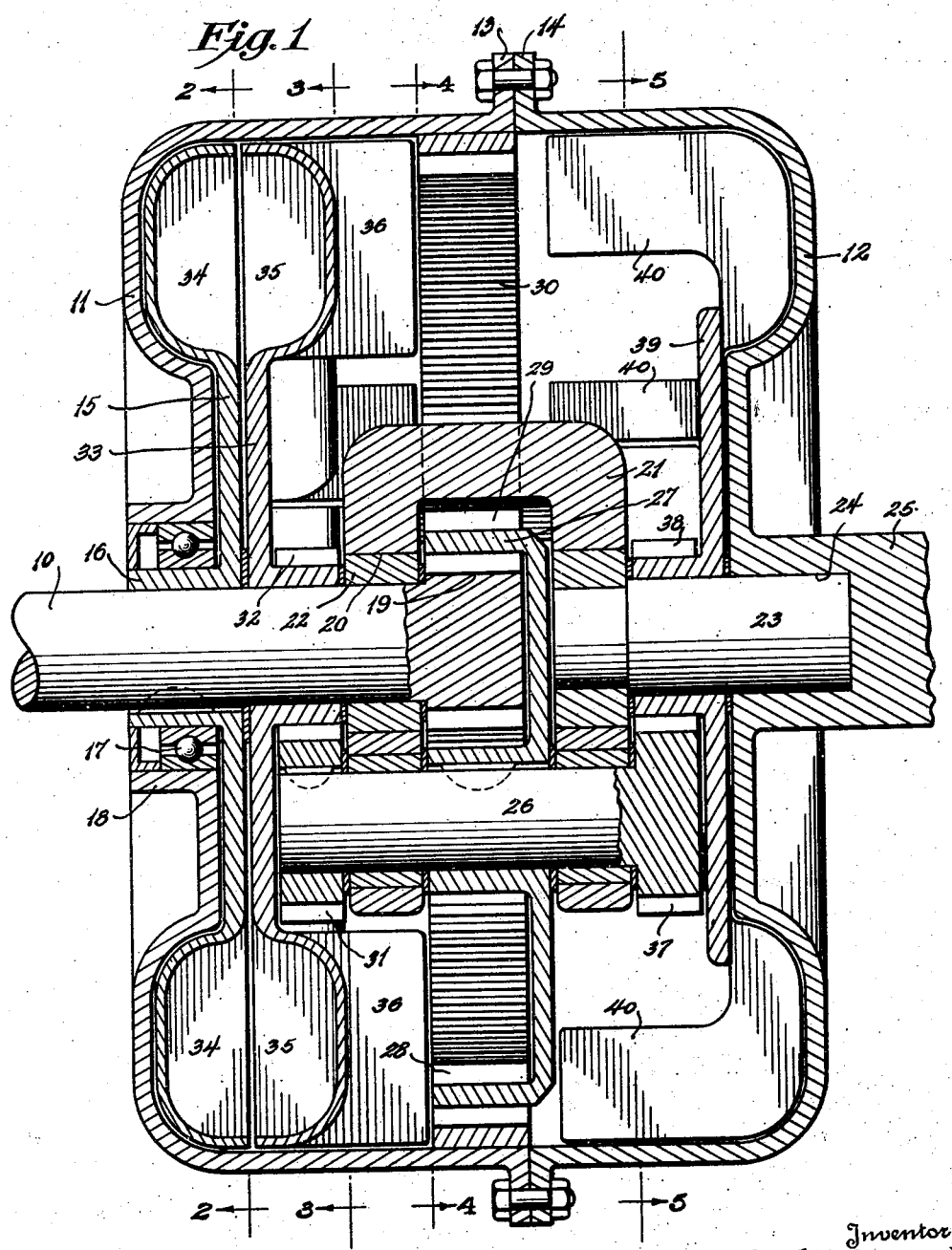
Figure 2:
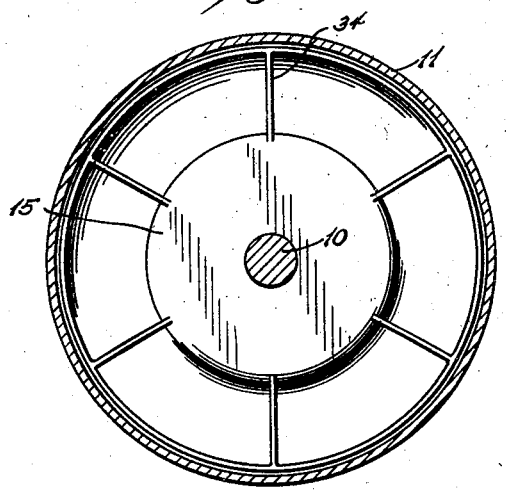
Figure 3:
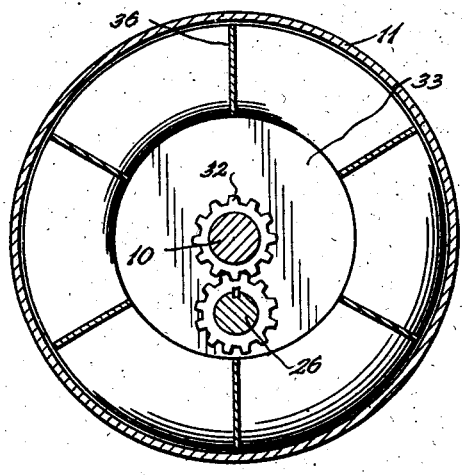
Figure 4:
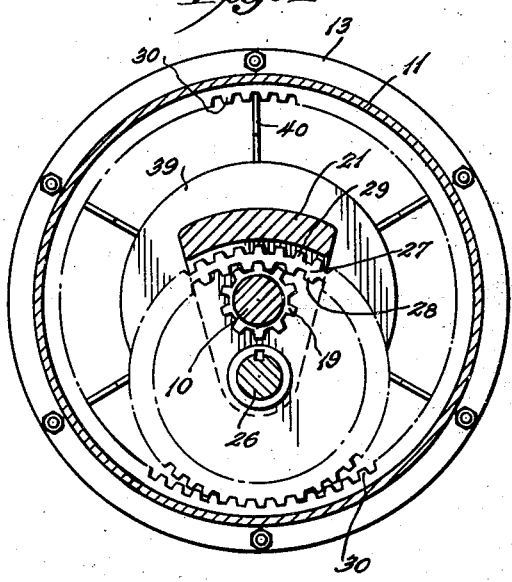
Figure 5:
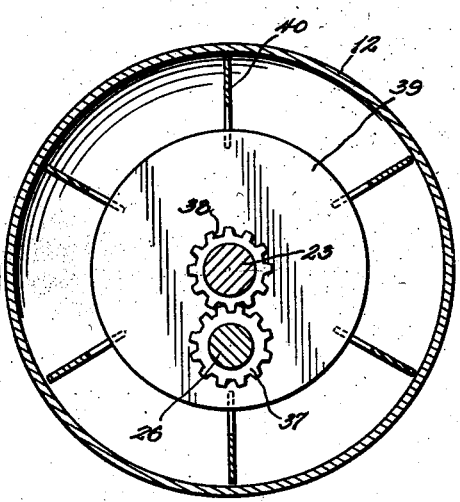

Other aims and advantages of the invention will appear in the specification, when considered in connection with the accompanying drawings, wherein:

Fig. 1 is a vertical sectional view of a fluid controlled transmission embodying the invention; and Figs. 2 to 5, inclusive, are cross sectional views taken on the lines 2—2 to 5—5 respectively of Fig. 1.

Referring particularly to the drawings, the transmission is shown as having an input main drive shaft 10 extending into a rotatable sealed casing shown as being made in two substantially cylindrical sections 11 and 12 bolted together through flanges 13 and 14 and adapted to be filled with the driving fluid, such as oil. The shaft 10 extends into the housing near its center and is shown as having keyed to it a primary baffle member 15 presenting a finished hub 16 which provides for mounting an ordinary ball bearing 17 between it and a hub portion 18 on the casing section 11.

The inner end of the shaft is shown as carrying an integral driving pinion 19 which is inserted through an enlarged bearing opening 20 in a U-shaped yoke member 21 arranged substantially centrally within the casing. After the other parts are assembled on the shaft 10, the pinion is inserted through the bearing opening 20 and a plain bearing ring 22 is forced into place. The opposite side of the yoke is mounted for rotation on a stub shaft 23 extending into a bore 24 of a driven element 25 integrally connected to the casing section 12.

Referring to Fig. 1, the forks of the yoke are shown as having plain bearings for an intermediate drive shaft 26 on which is keyed a double ring gear 27 extending between the forks and having internal teeth 28 meshing with the driving pinion 19. It also has external teeth 29 meshing with an internal ring gear 30 fixed in one section of the casing. The arrangement is such that the yoke can revolve as a unit within the casing when the casing is stationary by virtue of the intermediate gear drive. However, when the speed of the driven element 25 is equal to the speed of the main drive shaft 10, these gears will be locked or will remain relatively stationary and the casing will rotate at the same speed as the drive shaft.

On the input end of the intermediate shaft 26 there is shown a baffle driving pinion or gear 31 meshing with a gear 32 on the hub of a second baffle 33 which is journaled on the drive shaft 10 between the yoke 21 and the primary baffle 15. Both the primary baffle 15 and the second baffle 33 are shown as having angularly spaced vanes 34 and 35 and they are arranged to be rotated in opposite directions by virtue of the gear connections to the second baffle member 33. The second baffle member is also shown as having inwardly extending radial vanes 36 to offer as much resistance to rotation as possible within the confines of the casing near its periphery.

The other end of the intermediate shaft 26 is shown as having an integral driving pinion or gear 37 meshing with a gear 38 on the hub of a secondary baffle member 39 which likewise carries angularly spaced vanes 40 in the peripheral portion of the casing. These vanes may be and preferably are cupped or shaped to force the oil into and out of the annular bulge in the casing. The baffle member 39 is driven in the same direction as the second baffle member 33 and both of them rotate in a direction opposite from that of the drive shaft or input shaft while the housing remains stationary or when initial torque is being applied to rotate the housing.

In the operation of the transmission, let it be assumed that the input shaft turns clockwise as viewed from the left in Fig. 1. The baffle numbered 15, which is rigidly connected to it, likewise turns in a clockwise direction. However, the driving pinion 19 drives both the baffle members 33 and 39 through the spur gears 31 and 37 in a counterclockwise direction or opposite from the direction of the primary baffle member 34. While the transmission is developing driving torque the yoke within the casing revolves by virtue of the driving engagement between the double ring gear 27 and the internal ring gear 30. The primary baffle 15 imparts initial rotation to the oil in the casing in a clockwise direction and this rotation resists the tendency of both baffle members 33 and 39 to rotate the oil in the opposite direction, thereby greatly accelerating the torque action which tends to lock the gearing in the transmission and cause the casing to turn as a unit in a clockwise direction. When the casing reaches the same speed as the drive shaft the centrifugal force developed will tend to maintain the speed of the driven shaft the same as that of the driving shaft. However, the transmission is capable of being driven at all different speeds and will develop ratio changes to suit load changes.

From the foregoing description, it will be seen that the improved transmission is very simple in its construction and has no parts which are subjected to severe wear. The yoke and its associated gearing can be assembled as a unit and the whole transmission can be completed by connecting the separate casing sections. The rotatable parts within the casing are operated only when there is a difference between the speed of the driving and driven shaft or when torque is applied to the driven shaft. There are no external controls or gear shifting levers. The torque can be changed by making a simple change in the ratio between the spur gears on the intermediate shaft and the driven gears on the baffle members. Likewise, the applied torque can be varied by changing the viscosity of the oil or fluid. The design of the unit is such that it can easily be applied to any ordinary automobile or truck drive.

Obviously, the present invention is not restricted to the particular design thereof herein shown and described. Moreover, it is not essential that all the features of the invention be used conjointly, since they may be employed advantageously in various combinations and sub-combinations.

What is claimed is:

1. A fluid controlled transmission comprising, in combination, a drive shaft; a rotatable casing on the shaft having an internal ring gear; a primary baffle member on the drive shaft; a spur gear on the shaft within the casing; a yoke in the casing carrying an intermediate ring gear having internal teeth meshing with said spur gear and external teeth meshing with said internal ring gear in the casing; an intermediate shaft driven by said double ring gear; a second spur gear driven by said intermediate shaft; a rotatable baffle member in the casing having a gear meshing with said second spur gear; and a driven element connected to the casing.

2. A fluid controlled transmission comprising, in combination, a drive shaft; a rotatable casing on the shaft having an internal ring gear; a spur gear on the shaft within the casing; a yoke in the casing carrying an intermediate ring gear having internal teeth meshing with said spur gear and external teeth meshing with said internal ring gear in the casing; an intermediate shaft driven by said double ring gear; a pair of spur gears driven by said intermediate shaft; a pair of rotatable baffle members driven by said last named spur gears in a direction opposite to the drive shaft to create driving torque; and a driven member fixed on the casing.

3. A fluid controlled transmission comprising, in combination, a drive shaft; a rotatable casing on the shaft having an internal ring gear; a primary baffle member keyed to the drive shaft and arranged at one end of the casing; a spur gear on the shaft within the casing; a yoke in the casing carrying an intermediate ring gear having internal teeth meshing said spur gear and external teeth meshing with said internal ring gear in the casing; an intermediate shaft driven by said double ring gear; a pair of spur gears driven by said intermediate shaft; a pair of rotatable baffle members driven by said last named spur gears in a direction opposite to the drive shaft to create driving torque; and a driven member fixed on the casing.

4. A fluid transmission as set forth in claim 2 wherein the shaft of the intermediate double ring gear is journaled in the forks of the yoke on one side of the axis of the drive shaft.

VIRGIL F. STEWART.